United States Patent
Huang (10) Patent No.: US 12,395,773 B1
(45) Date of Patent: Aug. 19, 2025

(54) MULTI-FUNCTIONAL MICROPHONE AND VOICE CHAT DEVICE

(71) Applicant: Fujian EastWest Lifewit Technology Co., LTD, Fuzhou (CN)

(72) Inventor: Qi Huang, Fuzhou (CN)

( * ) Notice: Subject to any disclaimer, the term of this patent is extended or adjusted under 35 U.S.C. 154(b) by 0 days.

(21) Appl. No.: 19/022,797

(22) Filed: Jan. 15, 2025

(30) Foreign Application Priority Data

Dec. 16, 2024 (CN) .......................... 202423096660.2

(51) Int. Cl.
  *H04R 1/08* (2006.01)
  *A63F 13/215* (2014.01)
  *H04R 1/10* (2006.01)
  *H04R 3/00* (2006.01)

(52) U.S. Cl.
  CPC ............. *H04R 1/08* (2013.01); *A63F 13/215* (2014.09); *H04R 1/1008* (2013.01); *H04R 3/00* (2013.01)

(58) Field of Classification Search
  CPC .......... H04R 1/08; H04R 1/1008; H04R 3/00; H04R 1/342; H04R 19/04; H04R 1/2892; A63F 2300/6063; A63F 13/215
  USPC ... 381/91, 92, 122, 111, 113, 355, 363, 366, 381/75; 463/35
  See application file for complete search history.

(56) References Cited

U.S. PATENT DOCUMENTS

| | | | |
|---|---|---|---|
| 6,529,450 B1 * | 3/2003 | Sheffield | H04R 3/00 369/25.01 |
| 11,159,882 B2 * | 10/2021 | Song | H04R 1/1033 |
| 11,917,381 B2 * | 2/2024 | Grosz | H04R 1/04 |
| 12,108,201 B1 * | 10/2024 | Mai | H04R 1/08 |
| 2020/0289923 A1 * | 9/2020 | Bonanno | A63F 13/28 |
| 2022/0016520 A1 * | 1/2022 | Morita | A63F 13/215 |
| 2024/0066400 A1 * | 2/2024 | Mahlmeister | A63F 13/79 |

* cited by examiner

*Primary Examiner* — Xu Mei
(74) *Attorney, Agent, or Firm* — Nicholas Makridakis (57) ABSTRACT

A multi-functional microphone and a voice chat device are provided. The microphone includes an earphone amplifier module, a mixing module, a signal processing module, an amplification module, a sound pickup module, a power module, and a control unit. The earphone amplifier module is configured to transmit audio signals from an XBOX game controller, enabling direct connection between earphones and the XBOX game controller via the microphone. The microphone serves as an intermediary interface, ensuring compatibility with multiple earphones and expanding the range of earphone options for users. The sound pickup module is used to capture the user's voice, and the amplification module amplifies the voice while filtering out environmental noise, improving the signal-to-noise ratio. The control unit supports users in performing more complex operations such as enabling/disabling microphone functions and adjustments. The power module provides energy storage for the microphone, facilitating independent use by users.

13 Claims, 5 Drawing Sheets

MULTI-FUNCTIONAL MICROPHONE AND VOICE CHAT DEVICE

CROSS REFERENCE OF RELATED APPLICATIONS

This application claims priority of Chinese Patent Application No. 202423096660.2, filed on Dec. 16, 2024, entitled "Multi-Functional Microphone and Voice Chat Device," in the China National Intellectual Property Administration (CNIPA), the entire contents of which is hereby incorporated by reference in its entireties.

TECHNICAL FIELD

This disclosure relates to the field of railing devices, specifically to an adjustable railing.

BACKGROUND OF THE INVENTION

The most popular and widely used game controller on the market is Microsoft's XBOX controller. However, this controller does not have a built-in microphone. If users wish to transmit audio into the game, they must purchase an expensive and bulky Bluetooth headset, which is an unacceptable solution for budget-conscious users or those seeking simplicity. Alternatively, users may connect a HEADSET with a four-pole built-in microphone to the controller to capture audio. However, this method results in low recording volume, high noise levels, and the inability to mute the microphone with a single button. Additionally, real-time monitoring of the microphone audio is unavailable, and the headset's sound quality is poor. Furthermore, this setup negatively impacts the controller's battery life, creating an unfavorable experience for gamers. The lack of a built-in microphone in the controller prevents users from directly communicating with teammates via voice chat, and the official wireless headset is prohibitively expensive, resulting in high usage costs.

SUMMARY OF THE INVENTION

In view of the above, the objective of the invention is to propose a multi-functional microphone and a voice chat device to address issues such as poor audio recording and playback quality, insufficient battery life, and suboptimal gaming experiences during voice interactions in games.

To achieve the aforementioned technical objective, the technical solution adopted by the disclosure is as follows:

In a first aspect, the application provides a multi-functional microphone, comprising an earphone amplifier module, a mixing module, a signal processing module, an amplification module, a sound pickup module, a power module, and a control unit. The earphone amplifier module is electrically connected to the mixing module, which is further electrically connected to the signal processing module. The mixing module is electrically connected to an XBOX game controller, and the earphone amplifier module is electrically connected to earphones, configured to transmit audio signals from the XBOX game controller. The sound pickup module is electrically connected to the amplification module, which is further electrically connected to the signal processing module. The sound pickup module is configured to capture the user's voice. The control unit is electrically connected to the signal processing module and the power module.

In some embodiments, the multi-functional microphone further includes a first interface, a second interface, and a third interface. The first interface is electrically connected to the earphone amplifier module, which is configured to be detachably connected to earphones via the first interface. The second interface is electrically connected to the mixing module and the signal processing module, and the mixing module is configured to be detachably connected to the XBOX game controller via the second interface. The third interface is electrically connected to the power module, which is configured to be detachably connected to an external power source via the third interface.

In some embodiments, the first interface is a three-pole 3.5 mm earphone interface; and/or the second interface is a four-pole 3.5 mm game controller interface; and/or the third interface is a Type-C interface.

In some embodiments, the multi-functional microphone further includes a microphone gain adjustment module, which is electrically connected to the control unit.

In some embodiments, the multi-functional microphone further includes a mute control module, which is electrically connected to the control unit.

In some embodiments, the power module includes a battery and a charging protection module. The battery is electrically connected to the third interface, and the charging protection module is disposed between the battery and the control unit.

In some embodiments, the multi-functional microphone further includes an RGB ambient light and a light control module. The RGB ambient light is electrically connected to the control unit, and the light control module is electrically connected to the control unit.

In some embodiments, the multi-functional microphone further includes a touch sensing module, which is electrically connected to the mute control module and the light control module. The touch sensing module is configured to enable/disable the mute control module and adjust the RGB ambient light.

In some embodiments, the multi-functional microphone further includes a rotary potentiometer, which is electrically connected to the amplification module. The rotary potentiometer is equipped with a tactile switch, which is electrically connected to the control unit and configured to control the connection between the mixing module and the signal processing module.

In some embodiments, the electrical connection between the mixing module and the XBOX game controller is configured as one of the following: Bluetooth connection, Wi-Fi connection, NB-IoT connection, or 2.4G private protocol connection.

In some embodiments, the electrical connection between the mixing module and the XBOX game controller is configured as a wired connection and/or a wireless connection.

In some embodiments, in the case of a wireless connection, the multi-functional microphone further includes a first antenna, which is electrically connected to the mixing module. The multi-functional microphone further includes a receiver component, which is wirelessly connected to the mixing module.

In a second aspect, the application further provides a voice chat device, comprising a microphone, earphones, and an XBOX game controller. The microphone is the multi-functional microphone described in the first aspect. The earphones are electrically connected to the microphone, and the XBOX game controller is electrically connected to the microphone.

By adopting the aforementioned technical solution, the invention achieves the following beneficial effects compared to the prior art:

Unlike existing technologies, the above technical solution provides a multi-functional microphone. The microphone includes an earphone amplifier module, a mixing module, a signal processing module, an amplification module, a sound pickup module, a power module, and a control unit. The earphone amplifier module is electrically connected to the mixing module, which is further electrically connected to the XBOX game controller. The earphone amplifier module is electrically connected to earphones and is configured to transmit audio signals from the XBOX game controller. This enables direct connection between the earphones and the XBOX game controller via the microphone, eliminating the need for a dedicated headset. The microphone serves as an intermediary interface, ensuring compatibility with multiple earphones and expanding the range of earphone options for users. The sound pickup module is electrically connected to the amplification module, which is further electrically connected to the signal processing module. The sound pickup module is configured to capture the user's voice, and the amplification module amplifies the user's voice while filtering out environmental noise, thereby improving the signal-to-noise ratio. The control unit is electrically connected to the amplification module and the power module, enabling users to perform more complex operations such as enabling/disabling microphone functions and adjustments. The power module provides energy storage for the microphone, facilitating independent use by users.

BRIEF DESCRIPTION OF DRAWINGS

To describe the technical solutions in the embodiments of the invention or the prior art more clearly, the following briefly introduces the accompanying drawings required for describing the embodiments or the prior art. Obviously, the accompanying drawings in the following description show only some embodiments of the invention. For those of ordinary skill in the art, other drawings can be obtained from these accompanying drawings without creative effort.

REFERENCE CHARACTERS

1, Multi-functional microphone;
101, Earphone amplifier module;
102, Mixing module;
103, Signal processing module;
104, Amplification module;
105, Sound pickup module;
106, Battery;
107, Power module;
108, Control unit;
109, Microphone gain adjustment module;
110, Mute control module;
111, Charging protection module;
112, RGB ambient light;
113, Light control module;
114, Rotary potentiometer;
115, First interface;
116, Second interface;
117, Third interface;
118, Touch sensing module;
119, First antenna;
2, XBOX game controller;
3, Earphones;
4, First receiver;
401, Second indicator module;
402, Third button;
403, First wired interface;
404, Fourth button;
5, Second receiver;
501, Fourth wired interface;
502, Third indicator module;
503, Fifth button

DETAILED DESCRIPTION OF THE INVENTION

The following describes the invention in further detail with reference to the accompanying drawings and embodiments. It is specifically noted that the following embodiments are only used to illustrate the invention but do not limit its scope. Similarly, the following embodiments are only part of the embodiments of the invention and not all of them. All other embodiments obtained by those of ordinary skill in the art without creative effort shall fall within the protection scope of the invention.

Referring to FIGS. 1 to 4, in a first aspect, this embodiment provides a multi-functional microphone 1, comprising an earphone amplifier module 101, a mixing module 102, a signal processing module 103, an amplification module 104, a sound pickup module 105, a power module 107, and a control unit 108. The earphone amplifier module 101 is electrically connected to the mixing module 102, which is further electrically connected to the signal processing module 103. The mixing module 102 is electrically connected to the XBOX game controller 2, and the earphone amplifier module 101 is electrically connected to the earphones 3. The earphone amplifier module 101 is configured to transmit audio signals from the XBOX game controller 2. The sound pickup module 105 is electrically connected to the amplification module 104, which is further electrically connected to the signal processing module 103. The sound pickup module 105 is configured to capture the user's voice. The control unit 108 is electrically connected to the signal processing module 103 and the power module 107.

Figure 2:
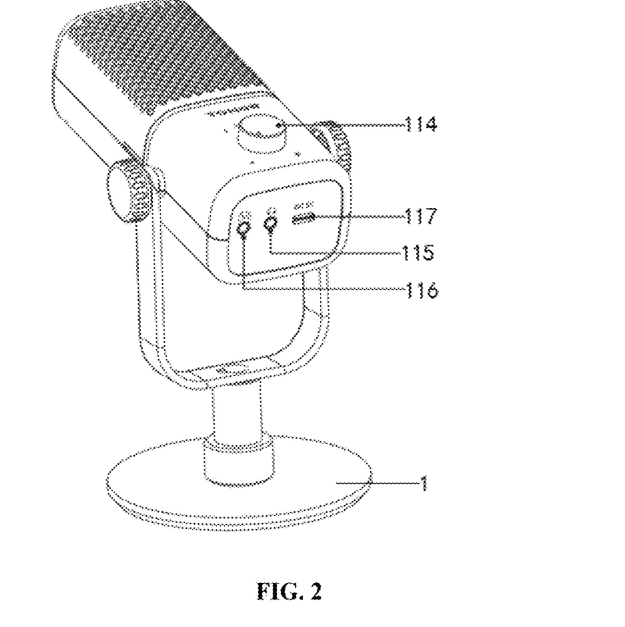
FIG. 2 is a first schematic diagram of the multi-functional microphone.
Figure 3:
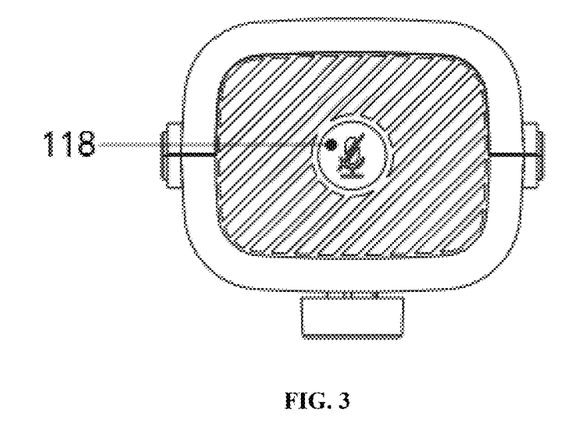
FIG. 3 is a second schematic diagram of the multi-functional microphone.
Figure 4:
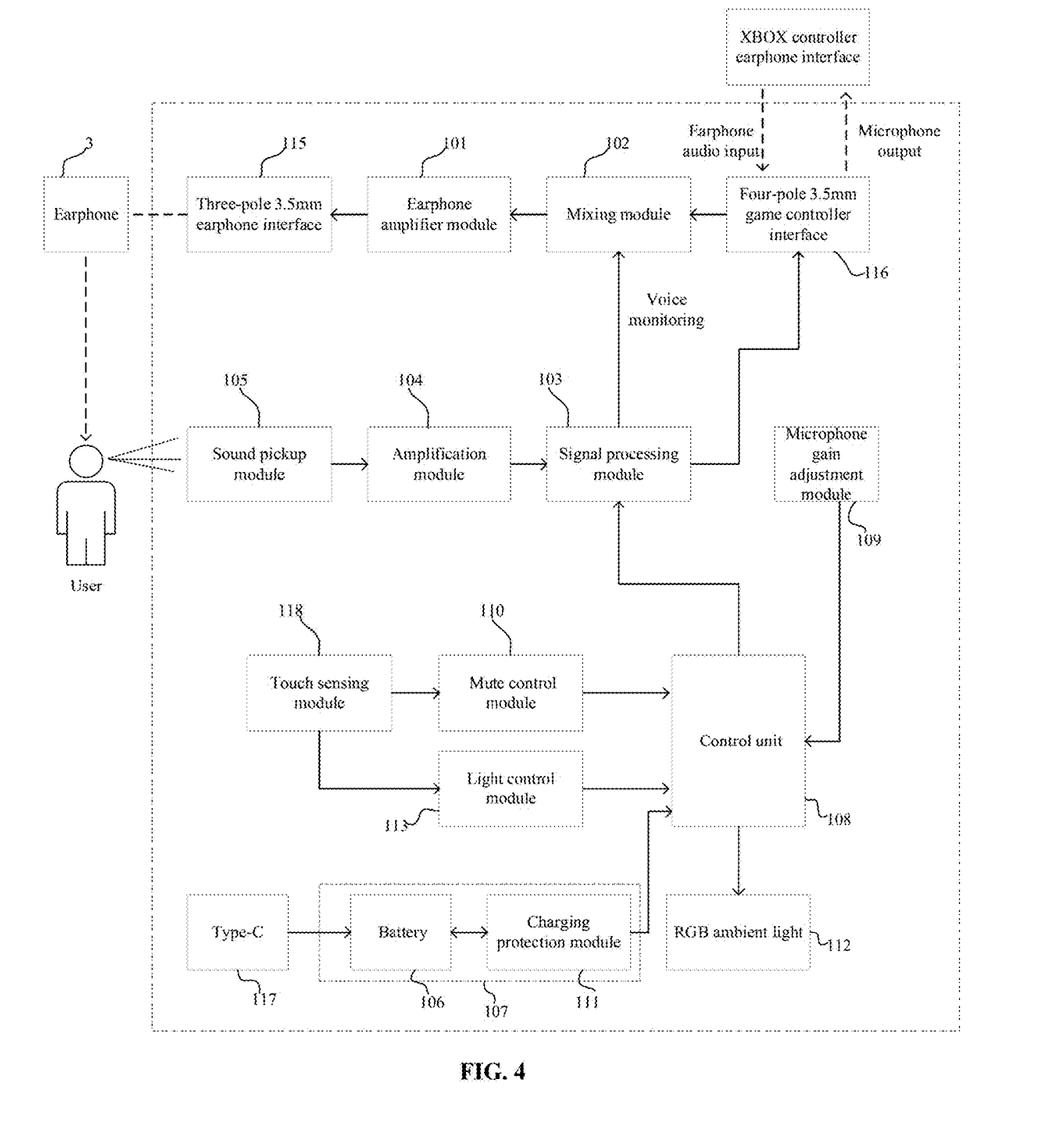
FIG. 4 is a module schematic diagram of the multi-functional microphone.

In this embodiment, the multi-functional microphone 1 may adopt the microphone structure shown in FIGS. 2 and 3. The internal circuit principle of the microphone is shown in FIG. 4. For clarity, the circuit principle is divided into the earphone amplifier module 101, the mixing module 102, the signal processing module 103, the amplification module 104, the sound pickup module 105, the power module 107, and the control unit 108.

Specifically, the earphone amplifier module 101 is an earphone amplifier module, whose main function is to amplify audio signals and transmit them to the earphones 3 or speakers. The mixing module 102 is used to mix multiple audio signals, adjusting and blending different sounds to produce a unified audio output. The mixing module 102 is electrically connected to the XBOX game controller 2, allowing the game audio, teammate voices, and other sound signals transmitted by the XBOX game controller 2 to be combined into a single audio signal through the mixing module 102. This signal is then transmitted to the earphones 3 via the earphone amplifier module 101. In this process, the microphone serves as an intermediary between the earphones 3 and the XBOX game controller 2.

The signal processing module 103 refers to an electrical component that processes signals. Specifically, the signal processing module 103 may include various processing functions such as filtering, gain control, compression, and expansion to improve signal quality or achieve specific audio effects. The amplification module 104 refers to an electrical component used to amplify signals, typically enhancing the strength of audio signals for transmission to other devices. The sound pickup module 105 refers to an electrical component used to capture sound, which may include condenser microphone units, dynamic microphone units, electromagnetic microphone units, etc. The sound pickup module 105 is electrically connected to the amplification module 104: the sound pickup module 105 captures the user's voice and transmits it to the amplification module 104, which amplifies these sound signals to improve the signal-to-noise ratio. The signal processing module 103 further processes the audio signals to enhance sound quality or achieve specific audio effects.

In some optional embodiments, the sound pickup module 105 is a cardioid condenser microphone. When capturing the user's voice, the cardioid condenser microphone offers advantages such as high sensitivity, strong directivity, and low noise.

In this embodiment, the power module 107 provides the necessary electrical power to various electrical components inside the microphone. The control unit 108 is used to control the functions and parameters of the microphone, such as volume adjustment and mode switching. Specifically, the control unit 108 may be a PLC microcontroller, microcomputer chip, or similar component.

In this embodiment, the multi-functional microphone 1 integrates multiple modules, enabling users to achieve various audio processing functions within a single device, thereby improving convenience. Through the coordination of the signal processing module 103 and the earphone amplifier module 101, the audio signal quality is significantly enhanced, providing users with a superior audio experience. The integration of the control unit 108 allows users to easily control various functions of the microphone without the need for multiple devices or complex operations. The multi-functional microphone 1 can be electrically connected to devices such as the XBOX game controller 2, improving device compatibility and applicability. By connecting the control unit 108 to the power module 107, power management is effectively handled, ensuring stable device operation and avoiding issues caused by unstable power supply.

Referring to FIG. 2, in some embodiments, the multi-functional microphone 1 further includes a first interface 115, a second interface 116, and a third interface 117. The first interface 115 is electrically connected to the earphone amplifier module 101, and the earphone amplifier module 101 is configured to be detachably connected to the earphones 3 via the first interface 115. The second interface 116 is electrically connected to the mixing module 102 and the signal processing module 103, and the mixing module 102 is configured to be detachably connected to the XBOX game controller 2 via the second interface 116. The third interface 117 is electrically connected to the power module 107, and the power module 107 is configured to be detachably connected to an external power source via the third interface 117.

The first interface 115 serves as the connection interface between the earphone amplifier module 101 and the earphones 3. By providing the first interface 115, the earphones 3 can be quickly plugged into the earphone amplifier module 101 inside the microphone. Optionally, the first interface 115 can be designed with different interface structures based on actual requirements.

The second interface 116 serves as the connection interface between the mixing module 102 and the XBOX game controller 2. By providing the second interface 116, the XBOX game controller 2 and the microphone can be quickly connected. The specific design of the second interface 116 can be customized according to actual needs.

The third interface 117 serves as the charging interface for the microphone. Through the third interface 117, power transmission between the microphone and an external power source can be achieved, including forward charging, reverse charging, or long-term power input.

In some embodiments, the first interface 115 is a three-pole 3.5 mm earphone interface; and/or the second interface 116 is a four-pole 3.5 mm game controller interface; and/or the third interface 117 is a Type-C interface. This design ensures compatibility with mainstream earphones 3, game controllers, and charging cables on the market, enhancing the adaptability and convenience of the multi-functional microphone 1 during use.

Referring to FIG. 4, in some embodiments, the multi-functional microphone 1 further includes a microphone gain adjustment module 109, which is electrically connected to the control unit 108. The microphone gain adjustment module 109 is used to adjust the gain (amplification factor) of the microphone signal to control the strength of the microphone input signal. The microphone gain adjustment module 109 may be a variable gain amplifier, which adjusts the gain of the amplifier to control the strength of the microphone signal. Variable gain amplifiers typically consist of adjustable resistors, operational amplifiers, and other components. Alternatively, the microphone gain adjustment module 109 may be a digital gain controller, which uses digital signal processing technology to adjust the gain by altering the amplitude of the digital signal. Additionally, the microphone gain adjustment module 109 may be a programmable amplifier, which features adjustable amplification factors that can be dynamically modified through programming or control signals to meet specific application requirements.

The microphone gain adjustment module 109 controls the strength of the microphone input signal by adjusting the gain of the microphone signal. Gain adjustment is typically achieved by controlling the amplification factor within the module. Depending on the requirements, the microphone signal can be amplified or reduced to suit different application scenarios. The microphone gain adjustment module 109 is also electrically connected to the control unit 108.

In this embodiment, the microphone gain adjustment module 109 allows for the adjustment of the microphone signal's gain, enabling better control over sound quality and avoiding situations where the signal is too weak or too strong. The microphone gain adjustment module 109 can adapt to different environments and applications by adjusting the microphone signal's gain according to specific scenarios and needs.

In some embodiments, the multi-functional microphone 1 further includes a mute control module 110, which is electrically connected to the control unit 108. The mute control module 110 is used to control the mute state of the audio signal, where "mute" refers to completely eliminating or reducing the audio signal to a level that is inaudible. Specifically, the mute control module 110 can be implemented using various technologies and designs, such as a mute switch, which toggles the mute state of the audio signal through a switching mechanism; a mute relay, which controls the mute state by switching the relay; or a mute circuit, which achieves muting by controlling switches or adjustable components within the circuit. The mute control module 110 is electrically connected to the control unit 108, which issues commands or signals to control the mute state. When the mute control module 110 receives a mute command from the control unit 108, it cuts off or reduces the strength of the audio signal to achieve a mute state. When a cancel mute command is received, the mute control module 110 restores normal transmission or amplification of the audio signal.

The mute control module 110 effectively controls the mute state of the audio signal, allowing users to conveniently eliminate or reduce the audio signal to an inaudible level. By using the mute control module 110, noise transmission can be effectively prevented when the audio signal is muted, enhancing audio clarity and quality. The mute control module 110 can also save power and energy by muting the audio signal when no audio output is required. Additionally, the mute control module 110 can protect audio equipment or speakers from damage by muting the audio signal in case of abnormalities or malfunctions. Through the mute control module 110, users can quickly and easily control the mute state of the audio signal as needed, improving the overall user experience.

Referring to FIG. 2, in some embodiments, the power module 107 includes a battery 106 and a charging protection module 111. The battery 106 is electrically connected to the third interface 117, and the charging protection module 111 is positioned between the battery 106 and the control unit 108. In this embodiment, the charging protection module 111 is designed to ensure the safety and stability of the battery 106 during the charging process. It typically includes a charging circuit and related protection circuits. The battery 106 is a device capable of storing and releasing electrical energy, with common types including lithium batteries, nickel-metal hydride batteries, and lead-acid batteries. The specific type and implementation of the charging protection module 111 and battery 106 may vary. For example, lithium batteries, a common battery type, typically include a charging management chip, charging circuit, discharge protection circuit, and temperature monitoring circuit in their charging protection module 111. Similarly, nickel-metal hydride batteries, another common type, usually include a charging circuit, overcharge protection circuit, and over-discharge protection circuit. Lead-acid batteries, often used in vehicle starting and energy storage systems, generally include a charging circuit, overcharge protection circuit, and over-discharge protection circuit in their charging protection module 111.

The charging protection module 111 primarily uses a charging management chip and related protection circuits to control and safeguard the battery 106 during charging. During the charging process, the charging management chip monitors parameters such as battery voltage, current, and temperature, and controls the charging circuit's operation based on a predefined charging algorithm. When the battery voltage reaches the preset charging termination voltage, the charging protection module 111 automatically stops charging to prevent overcharging. Additionally, the charging protection module 111 monitors the battery's temperature and current, as well as detects abnormalities during charging, such as overcurrent or short circuits. If an abnormality is detected, the charging protection module 111 immediately cuts off the charging circuit to protect the battery 106 and other circuits.

In this embodiment, the inclusion of the charging protection module 111 allows for monitoring and controlling charging parameters to prevent issues such as overcharging, over-discharging, and overcurrent, thereby enhancing the safety of the battery 106. The charging protection module 111 can regulate the charging circuit's operation based on a predefined charging algorithm, improving the stability of the charging process and extending the battery's lifespan. It can also promptly disconnect the charging circuit to prevent damage to the battery 106 during abnormal charging conditions, protecting the battery's performance and longevity. Furthermore, by optimizing the charging algorithm and controlling the charging circuit, the charging protection module 111 can improve charging efficiency, reduce energy loss, and shorten charging time.

In some embodiments, the multi-functional microphone 1 further includes an RGB ambient light 112 and a light control module 113. The RGB ambient light 112 is electrically connected to the control unit 108, and the light control module 113 is also electrically connected to the control unit 108. Specifically, the RGB ambient light 112 is a lighting device capable of emitting red, green, and blue light. By mixing these three primary colors in varying proportions, it can produce a wide range of lighting effects. The light control module 113 is an electronic module used to control lighting, typically including a control circuit and related interfaces, enabling adjustments to brightness, color, and other parameters. Common RGB ambient lights 112 include LED strips and bulbs, which integrate red, green, and blue LED light sources and use control circuits to adjust color and brightness. The light control module 113 can be a standalone electronic device or an integrated control circuit within the lighting fixture. The RGB ambient light 112 works by controlling the brightness and mixing ratio of the red, green, and blue LED light sources to achieve various lighting effects, such as flame lights, colorful lights, breathing lights, and off modes. A single button click can control the microphone's mute switch, while the RGB light turns red. The light control module 113, connected to the control unit 108, receives control signals and transmits corresponding commands to the RGB ambient light 112, allowing users to control brightness, color, and lighting modes through their actions.

In this embodiment, the RGB ambient light 112 can mix red, green, and blue light sources to produce a variety of lighting effects, creating a rich and diverse color environment. The RGB ambient light 112 can adjust brightness and color according to different scenes and needs, enhancing the ambiance and improving the aesthetic and comfort of the space. By connecting the light control module 113 to the control unit 108, users can remotely control the lighting's on/off state, brightness, and color, increasing convenience and flexibility in lighting control.

Referring to FIGS. 3 and 4, in some embodiments, the multi-functional microphone 1 further includes a touch sensing module 118. The touch sensing module 118 is electrically connected to the mute control module 110 and the light control module 113. The touch sensing module 118 is used to control the activation and deactivation of the mute control module 110, thereby achieving the mute effect for the microphone's sound pickup function. The touch sensing module 118 is an electronic module capable of detecting and responding to human touch actions, triggering corresponding functions or operations through the detection of human contact. Furthermore, the touch sensing module 118 is connected to the light control module 113, so when the touch sensing module 118 receives a touch signal, it adjusts the display mode of the RGB ambient light 112 via the light control module 113. The touch sensing module 118 may be a capacitive touch sensing module or a resistive touch sensing module. The capacitive touch sensing module detects touch actions by sensing changes in human capacitance, commonly found in touchscreens and touch switches. The resistive touch sensing module detects touch actions by sensing changes in resistance between the human body and a resistive touch panel, commonly found in resistive touch switches and buttons.

In this embodiment, the inclusion of the touch sensing module 118 also enhances the microphone's appearance, making it more streamlined and user-friendly, thereby improving user comfort and experience.

In some embodiments, the multi-functional microphone 1 further includes a rotary potentiometer 114. The rotary potentiometer 114 is electrically connected to the amplification module 104 and is equipped with a tactile switch. The tactile switch is electrically connected to the control unit 108 and is used to control the connection between the mixing module 102 and the signal processing module 103. The rotary potentiometer 114 is an adjustable resistor that changes its resistance value through rotation, thereby regulating the current or voltage in the circuit. It typically features a rotating shaft and a range of rotation angles, allowing users to adjust the resistance value by rotating the shaft. The tactile switch is a momentary switch that toggles the circuit state when pressed and released, commonly triggered by a light touch or press of a button, and is used to control the circuit's switching function.

The rotary potentiometer 114 with a tactile switch combines the functions of a rotary potentiometer and a tactile switch, enabling users to adjust resistance values while also triggering switch operations. Typically, the rotary shaft of the potentiometer includes a button or knob that users can press to trigger the switch operation. This design is highly convenient for certain applications, such as adjusting volume levels. Users can rotate the potentiometer to adjust the volume and press the tactile switch to toggle the mute state when needed. The rotary potentiometer 114 with a tactile switch offers two independent functions: adjusting resistance values and performing switch operations, providing users with more convenient control over circuit functions.

In this embodiment, the rotary potentiometer 114 is electrically connected to the amplification module 104. By rotating the potentiometer, users can adjust the amplification factor of the operational amplifier, controlling the output signal level and thereby adjusting the microphone's recording gain. The tactile switch pin of the rotary potentiometer 114 is connected to the I/O detection port of the control unit 108. The control unit 108 detects whether the switch is pressed, toggling the output of high or low-level signals. The enable pin of the signal processing module 103 receives these high or low-level signals, controlling whether the microphone signal is output to the earphone amplifier module 101. This, in turn, controls whether the earphone 3 signal is output, enabling the microphone's monitoring function. This embodiment allows for simple and quick activation or deactivation of the monitoring function, avoiding the need for complex monitoring switch operations on the XBOX console, which could lead to recording abnormalities.

In some embodiments, the electrical connection between the mixing module 102 and the XBOX game controller 2 is configured as one of the following: Bluetooth connection, Wi-Fi connection, NB-IoT connection, or 2.4G private protocol connection.

In this embodiment, the mixing module 102 has a built-in Bluetooth module and supports Bluetooth mode. The mixing module 102 can pair with the XBOX game controller 2 using Bluetooth mode, enabling stable full-link 48 KHz@24 bit high-definition audio transmission. This optimizes noise interference and provides a high-quality audio experience. The mixing module supports ultra-low latency transmission, with end-to-end latency as low as 10 ms, meeting the low-latency requirements of gaming headsets.

In this embodiment, the mixing module 102 can establish a connection with the XBOX game controller 2 via Wi-Fi. The mixing module 102 has a built-in Wi-Fi module that supports the 2.4 GHz frequency band, allowing direct connection to the control device without the need for an additional router. The mixing module 102 uses Wi-Fi to transmit data to and from the XBOX game controller 2, providing a stable wireless connection. The mixing module 102 also supports remote control via Ethernet, LAN, or Wi-Fi, offering flexible control options.

In this embodiment, the mixing module 102 can communicate with the XBOX game controller 2 via an NB-IoT network. The mixing module 102 has a built-in NB-IoT module that supports low-power wide-area network communication. The mixing module 102 uses the NB-IoT network to establish a remote connection with the XBOX game controller 2, making it suitable for scenarios requiring remote control.

In this embodiment, the mixing module 102 can establish a connection with the XBOX game controller 2 using a 2.4G private protocol. The mixing module 102 supports the 2.4G private protocol, enabling ultra-low latency transmission with a minimum end-to-end latency of 23 ms. The mixing module 102 connects to the XBOX game controller 2 via the 2.4G private protocol, providing a high-quality audio experience and high-definition call quality.

In some embodiments, the electrical connection between the mixing module 102 and the XBOX game controller 2 is configured as a wired connection and/or a wireless connection.

In this embodiment, the mixing module 102 is connected to the XBOX game controller 2 via a standard USB or audio interface for a wired connection. The second interface 116 serves as the connection interface between the mixing module 102 and the XBOX game controller 2. By configuring the second interface 116, the XBOX game controller 2 and the microphone can be quickly connected. The specific design of the second interface 116 can be customized according to actual requirements, enabling a wired connection between the mixing module 102 and the XBOX game controller 2, ensuring stable data transmission and audio output.

In this embodiment, the mixing module 102 uses standard protocols to wirelessly pair with the XBOX game controller 2. The mixing module 102 can use Bluetooth connectivity, requiring users to ensure that the Bluetooth functions of both the mixing module 102 and the XBOX game controller 2 are enabled. Users must select the corresponding Bluetooth channel on the mixing module 102 for pairing. The mixing module 102 can also use a 2.4G wireless connection, supporting 2.4G wireless connectivity by using a wireless USB-A receiver to establish a connection with the XBOX game controller 2.

In this embodiment, the mixing module uses a private protocol to wirelessly pair with the XBOX game controller. The mixing module can use one-to-one pairing, employing a private encryption protocol similar to the one-to-one pairing method used by wireless mice, ensuring secure and stable connections. Users need to follow specific pairing steps, such as simultaneously holding down specific buttons on the mixing module 102 and the XBOX game controller 2 for a certain duration, then inserting the wireless receiver to complete the pairing. The mixing module 102 can also use encrypted connections, with its private protocol providing encryption functionality similar to that of wireless mice, ensuring the security of data transmission. During the pairing process, users may need to initiate pairing mode using specific button combinations or operations and complete the pairing when the indicator light flashes.

Figure 7:
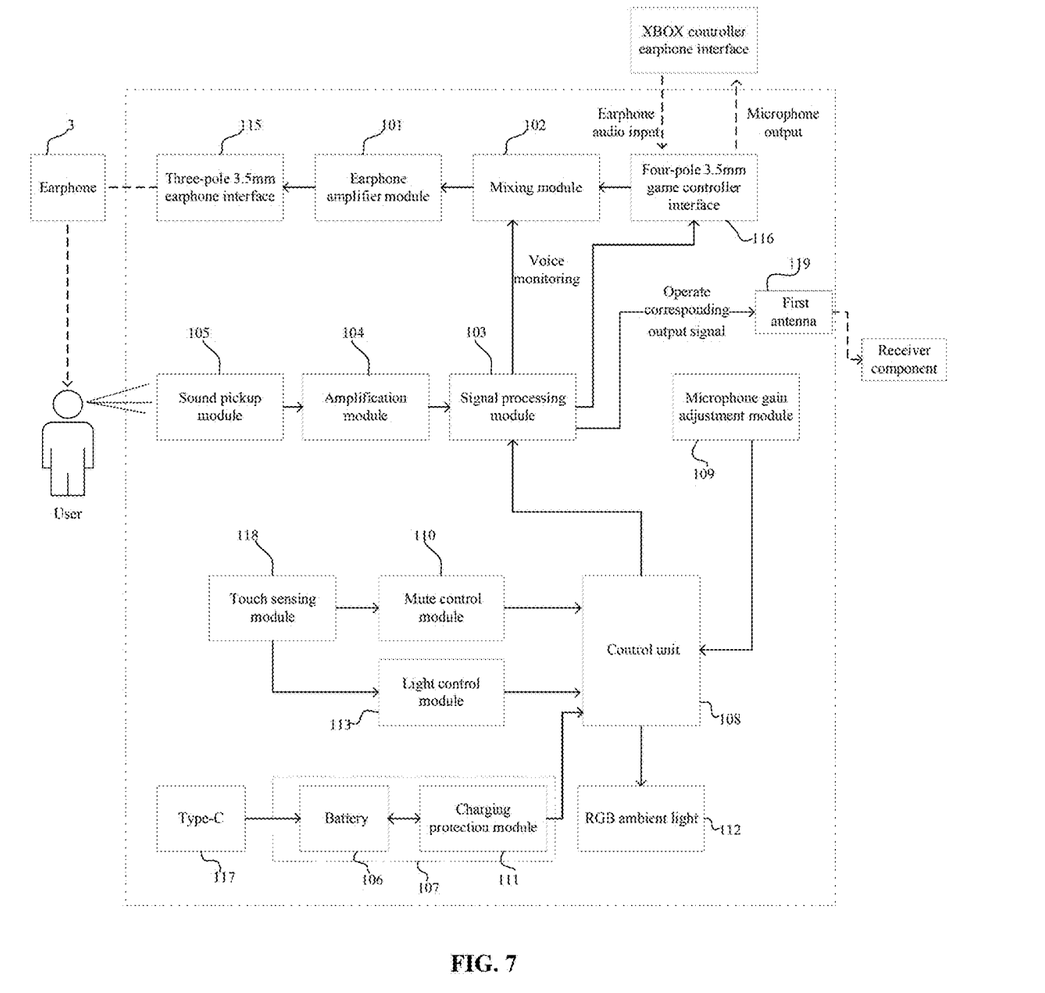
FIG. 7 is a module schematic diagram of the multi-functional microphone and the receiver.

In some embodiments, in the case of a wireless connection, the multi-functional microphone 1 further includes a first antenna 119, which is electrically connected to the mixing module 102. The multi-functional microphone 1 also includes a receiver component, which is wirelessly connected to the mixing module 102.

Specifically, the multi-functional microphone 1 includes the first antenna 119, which is used to transmit radio frequency signals. The first antenna 119 propagates the data information of the multi-functional microphone 1 in the form of electromagnetic waves through the air, enabling the multi-functional microphone 1 to establish a communication connection with the receiver component.

Figure 5:
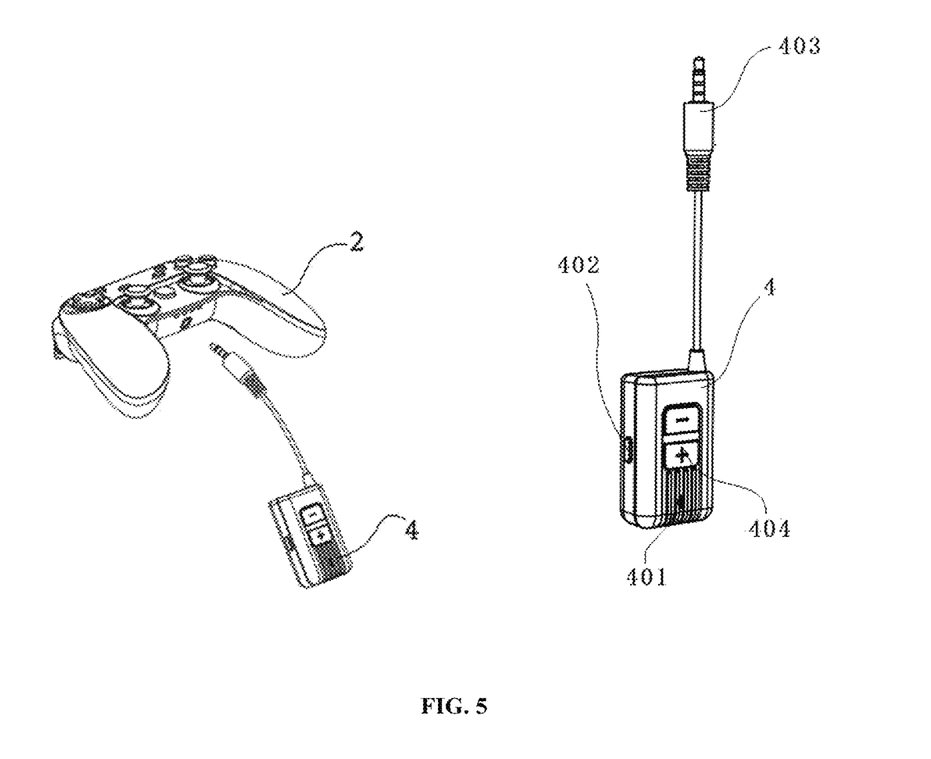
FIG. 5 is a schematic diagram of the first receiver.

Referring to FIGS. 5 and 7, in some embodiments, the receiver component includes a first receiver 4. The first receiver 4 has a first wired interface 403 and a second antenna. The first wired interface 403 is plugged into the XBOX game controller 2, and the second antenna establishes a wireless communication connection with the first antenna 119.

In this embodiment, the first wired interface 403 may be a four-pole 3.5 mm audio jack. Through a data cable, the first wired interface 403 can be plugged into the XBOX game controller 2. When the first wired interface 403 is connected to the XBOX game controller 2, it can be recognized as a USB interface by the XBOX game controller 2, allowing users to record the captured user voice using the XBOX game controller 2.

In this embodiment, the receiver component includes the first receiver 4. The first receiver 4 includes the first wired interface 403 and the second antenna. The first wired interface 403 is used to connect to the XBOX game controller 2, and the second antenna establishes a wireless connection with the first antenna 119. A second control unit 401 is electrically connected to a second connection module, a second power module, and a second adjustment module, respectively.

In this embodiment, the second control unit may be selected as a chip of the same model as the control unit 108 to facilitate wireless data connection between the multi-functional microphone 1 and the first receiver 4. The second control unit may be a JL7016M chip, enabling compatible connection with any host device plugged into the first receiver 4.

The third button 402 is a multi-function button. The third button 402 can be used to turn the first receiver 4 on or off, enable or disable the headphone monitoring function of the first receiver 4, and enable or disable the pairing status between the first receiver 4 and the multi-functional microphone 1.

In some embodiments, the first receiver 4 further includes a second wired interface, which is electrically connected to the earphones.

Specifically, the first receiver 4 further includes the second wired interface, which may be a 3.5 mm audio jack, 2.5 mm audio jack, USB interface, or Type-C interface, depending on the earphones' connection requirements. Through a data cable, the second wired interface can be electrically connected to the earphones to meet practical usage needs. For example, plugging in the earphones allows users to hear music or game sounds, as well as their own real-time voice. Similarly, the design of the second wired interface considers common earphone plug types on the market, ensuring broad compatibility. The audio signal processed by the mixing module 104 is transmitted directly to the earphones through the second wired interface, providing real-time monitoring functionality. The second antenna is used to receive radio frequency signals, enabling the first receiver 4 to establish a wireless connection with the multi-functional microphone 1 via the first antenna 119 and the second antenna, meeting practical usage needs.

In the current embodiment, the first receiver 4 further includes the second wired interface, which is located on the side or bottom of the first receiver 4 for convenient user connection to earphones. Users can directly plug the earphone jack into the second wired interface of the first receiver 4 to achieve audio signal transmission. If the earphones require power, the second wired interface can also provide power to ensure the earphones' normal operation. The second wired interface may integrate volume control functionality, allowing users to adjust the earphone volume via control buttons on the first receiver 4.

In some embodiments, the first receiver 4 further includes a third wired interface, which is electrically connected to a terminal device.

Specifically, the first receiver 4 includes the third wired interface, which may be a Type-C interface. Through a data cable, the third wired interface can establish a wired connection with the terminal device 6 to meet practical usage needs. For example, plugging in earphones allows users to hear music or game sounds, as well as their own real-time voice. When the third wired interface is connected to a computer, it can be recognized as a USB interface by the computer, enabling users to record the user's voice captured by the first receiver 4 using the computer.

In some embodiments, the design of the first receiver has been further optimized to enhance its functionality and compatibility. Specifically, the first receiver not only includes the basic ability to receive and process signals but also incorporates an additional third wired interface. This third wired interface is designed to establish electrical connections with various terminal devices, thereby expanding the application scope and practicality of the first receiver 4. Through this third wired interface, the first receiver 4 can seamlessly connect with multiple types of terminal devices, such as computers, smartphones, and tablets. This connection is not limited to physical linkage but also involves deep integration of data transmission and signal processing. The design of the third wired interface takes into account the interface standards and data transmission rates of different devices, ensuring broad compatibility and high performance. Additionally, the third wired interface can support multiple communication protocols, enabling the first receiver 4 to adapt to various network environments and application requirements. This design not only improves the flexibility and adaptability of the first receiver 4 but also facilitates its deployment in diverse application scenarios.

By adding the third wired interface to the first receiver 4, the beneficial effects of the embodiment are significant. First, this design greatly enhances the multifunctionality and applicability of the device, enabling effective connection and data exchange with various terminal devices. This not only strengthens the device's market competitiveness but also provides users with greater convenience and flexibility. Second, the introduction of the third wired interface allows the device to support a wider range of application scenarios, thereby expanding its potential market scope. Additionally, this design helps improve the stability and efficiency of data transmission, ensuring the device's reliability and performance in various network environments. Overall, the addition of the third wired interface brings higher practical value and market potential to the first receiver 4.

In some embodiments, the first wired interface 403 is configured as a four-pole 3.5 mm jack; and/or the second wired interface is configured as a 3.5 mm earphone jack; and/or the third wired interface is configured as a Type-C interface.

In some embodiments, the configuration of the wired interfaces is carefully designed to meet the needs of different devices and application scenarios. Specifically, the first wired interface 403 is configured as a four-pole 3.5 mm jack. This design allows the earphones to support microphone functionality, as the four-pole jack includes left channel, right channel, microphone, and ground wires. The design of this jack considers the interface standards of different devices, ensuring broad compatibility. The second wired interface is configured as a 3.5 mm earphone jack, which is widely used in various audio devices and provides stable audio transmission capabilities. The third wired interface is configured as a Type-C interface, which supports data transmission, charging, and audio/video signal transmission, making it suitable for various modern devices. The Type-C interface's reversible plug design enhances user convenience.

The embodiment of this wired interface configuration offers significant beneficial effects. First, by providing multiple interface types, the device's market competitiveness is enhanced, as it can meet the needs and preferences of different users. Second, this design improves the stability and efficiency of data transmission, ensuring the device's reliability in various network environments. Additionally, the broad compatibility of the interfaces allows the device to adapt to different application scenarios, thereby expanding its potential market scope.

Figure 6:
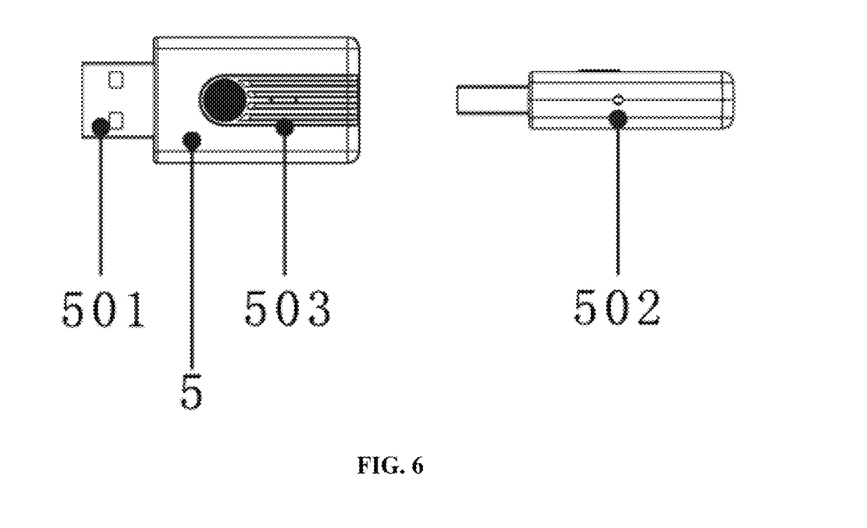
FIG. 6 is a schematic diagram of the second receiver.

In some embodiments, the receiver component includes a second receiver 5. The second receiver 5 has a fourth wired interface 501 and a third antenna. The fourth wired interface 501 is plugged into a terminal device, and the third antenna establishes a wireless communication connection with the first antenna 119.

Referring to FIGS. 6 and 7, in some embodiments, the receiver component includes the second receiver 5. The second receiver 5 includes a third connection module, a third control unit, and a third adjustment module. The third connection module includes the fourth wired interface 501 and the third antenna. The fourth wired interface 501 is used to connect to the terminal device, and the third antenna is used to establish a wireless connection with the first antenna 119. The third adjustment module includes a fifth button 503, which is used to enable or disable the pairing function of the second receiver 5. The third control unit is electrically connected to the third connection module and the third adjustment module, respectively.

In some embodiments, the fourth wired interface 501 is configured as a USB interface; or, the fourth wired interface 501 is configured as a Type-C interface.

In some embodiments, the fourth wired interface 501 is carefully designed to meet the needs of modern devices. Specifically, the fourth wired interface 501 can be configured as a USB interface, which is widely used in various devices and supports functions such as data transmission, charging, and connecting external devices. Additionally, the fourth wired interface 501 can also be configured as a Type-C interface, which supports reversible plugging, solving the issue of incorrect plugging with traditional USB interfaces.

The embodiment of this wired interface configuration offers significant beneficial effects. First, by providing multiple interface types, the device's market competitiveness is enhanced, as it can meet the needs and preferences of different users. Second, this design improves the stability and efficiency of data transmission, ensuring the device's reliability in various network environments. Additionally, the broad compatibility of the interfaces allows the device to adapt to different application scenarios, thereby expanding its potential market scope. The versatility and compatibility of the Type-C interface make it the future mainstream USB interface, supporting multiple protocols and device connections, further enhancing the device's practicality and flexibility.

In a second aspect, the application further provides a voice chat device, comprising a microphone, earphones, and an XBOX game controller. The microphone is the multi-functional microphone described in the first aspect. The earphones are electrically connected to the microphone, and the XBOX game controller is electrically connected to the microphone.

Figure 1:
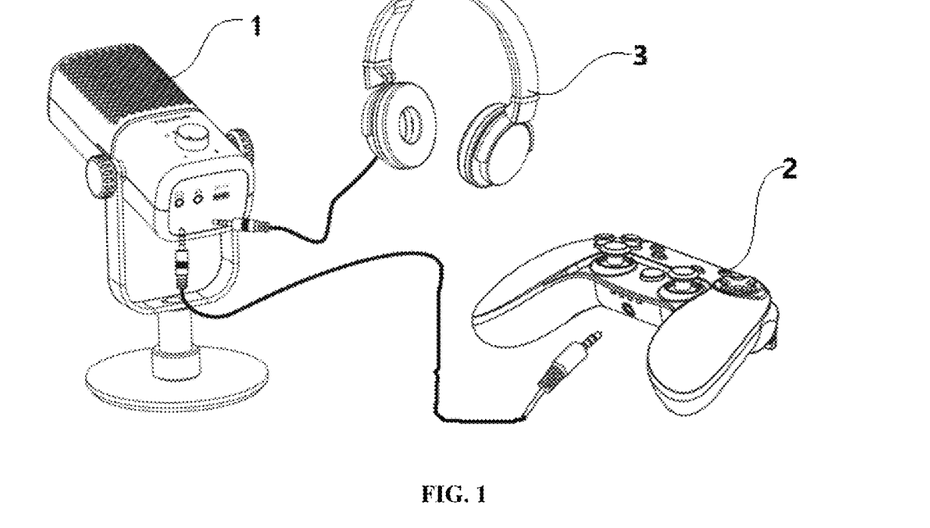
FIG. 1 is a schematic diagram of the voice chat device.

Referring to FIG. 1, in the second aspect, this embodiment further provides a voice chat device, comprising a microphone, earphones 3, and an XBOX game controller 2. The microphone is the multi-functional microphone 1 described in the first aspect. The earphones 3 are electrically connected to the microphone, and the XBOX game controller 2 is electrically connected to the microphone.

Furthermore, the following specific application example can be combined to further understand the aforementioned technical solution:

The most popular and widely used game controller on the market is Microsoft's XBOX controller. However, this controller does not have a built-in microphone. If users wish to transmit audio into the game, they must purchase an expensive and bulky Bluetooth headset, which is unacceptable for budget-conscious users or those seeking simplicity. Alternatively, users may connect a HEADSET with a four-pole built-in microphone to the controller to capture audio. However, this method results in low recording volume, high noise levels, and the inability to mute the microphone with a single button. Additionally, real-time monitoring of the microphone audio is unavailable, and the headset's sound quality is poor. Furthermore, this setup negatively impacts the controller's battery life, creating an unfavorable experience for gamers. To address these issues, we propose a microphone that solves the problems of poor recording and playback quality, insufficient battery life, lack of ambient lighting, and suboptimal gaming experiences during voice interactions in games. The XBOX game controller lacks a built-in microphone, preventing users from directly communicating with teammates via voice chat. The official wireless headset is prohibitively expensive, resulting in high usage costs. The HEADSET four-pole gaming headset has poor sound quality, picks up environmental noise noticeably, and lacks features such as microphone gain adjustment and one-touch mute, leading to a poor user experience. Users cannot monitor their own voice in real-time, making it difficult to assess the quality or volume of their speech. During team communication, users cannot immediately determine if their microphone is malfunctioning or if their teammates can hear them.

To address these issues, a microphone is provided. The microphone includes three interfaces: an earphone output interface (first interface), an XBOX connection interface (second interface), and a charging port (third interface). The XBOX game controller's audio interface is connected to the microphone's XBOX connection interface, and the microphone's earphone output interface is connected to the earphones. The microphone features a multi-function button that includes at least the following functions: power on/off, microphone mute, microphone monitoring, and monitoring volume adjustment. The microphone is equipped with at least a sound pickup module, a signal processing module, a mixing module, an earphone amplifier module, and a charging protection module.

Furthermore, the microphone features built-in RGB ambient lighting. By long-pressing the touch button, users can control the lighting modes, including flame light, colorful light, breathing light, and off. A single click on the button can toggle the microphone's mute function, while the RGB light turns red. Specifically, the RGB ambient lighting can use RGB programmable LED beads with a built-in control chip. The control unit employs the HK32F0301MF4P7 microcontroller chip, and the touch button uses the AIP5901 touch chip. The touch chip detects single-click or long-press operations and transmits the detection signal to the microcontroller. Upon recognizing the signal, the microcontroller outputs corresponding control signals to the RGB programmable LED beads, enabling the switching of various lighting modes. By long-pressing the touch button, users can cycle through lighting modes, including flame light, colorful light, breathing light, and off. The microphone includes a built-in battery and a charging protection module to power the internal modules, including the audio processing system and lighting control system. A cardioid condenser microphone is used to capture the user's voice, offering high sensitivity, strong directivity, and low noise. The audio signal undergoes noise reduction and amplification through the signal processing module to improve the signal-to-noise ratio. The microphone's XBOX connection interface amplifies the game audio output from the controller and mixes it with the user's voice signal. The mixed signal is then amplified by the earphone amplifier module and output to the user's earphones. The microphone's built-in real-time voice monitoring can be easily enabled or disabled via the signal switching function of the mixing module, avoiding the need for complex monitoring switch operations on the XBOX console, which could lead to recording abnormalities.

Furthermore, the touch chip detects a single-click operation and transmits the detection signal to the microcontroller. Upon recognizing the signal, the microcontroller outputs high or low-level control signals to the signal processing module. The signal processing module internally consists of an analog switch chip that forms a logic switching circuit. When the analog switch chip receives the control signal, it toggles the connection between the microphone's input and output signal paths, thereby switching between mute and active sound pickup states. Simultaneously, the microcontroller controls the RGB programmable LED beads to turn red, indicating the mute state.

In this embodiment, the microphone's circuit board includes a touch-sensitive button module, a sound pickup module, and a signal processing module. The touch chip enables button detection, while the microphone capsule captures sound and amplifies the audio signal through an operational amplifier module before outputting it to the XBOX game controller. Communication between these modules enables one-touch mute functionality. The circuit board also includes an amplification module, a microcontroller control module (i.e., the control unit), an earphone amplifier module, and a potentiometer adjustment module. The rotary potentiometer with a switch function adjusts the amplification factor of the operational amplifier, controlling the output signal level to adjust the microphone's recording gain. The tactile switch pin of the rotary potentiometer is connected to the microcontroller's I/O detection port. The microcontroller detects whether the switch is pressed, toggling the output of high or low-level signals. The enable pin of the operational amplifier chip receives these signals, controlling whether the microphone signal is output to the earphone amplifier chip, thereby determining whether the earphone signal is output and enabling the microphone's monitoring function. The module board includes a charging protection module, which uses a charging management chip to effectively control the battery's charging voltage and current, ensuring no safety hazards due to overcurrent or overvoltage. By communicating with the microcontroller, the device implements a protection mechanism that shuts down during charging.

The microphone uses a Type-C interface as the charging input and a polymer lithium-ion battery with a built-in protection board as the power source. The battery supplies power to the microphone's various functional modules, accompanied by a charging protection module composed of the CL4056D charging management chip. This ensures safe charging while enabling fast charging functionality, addressing concerns about the microphone's battery life.

The sound pickup module uses a 14 mm diameter cardioid condenser microphone to capture the user's voice, offering high sensitivity, strong directivity, and low noise. The audio signal undergoes noise reduction through an RC filter in the signal processing module and is amplified by the GS4580-SR audio power amplifier module. The use of an operational amplifier ensures that the audio signal is amplified without amplifying circuit noise, significantly improving the signal-to-noise ratio and delivering high-quality audio signal input.

The XBOX connection interface on the microphone amplifies the game audio output from the XBOX game controller and mixes it with the user's voice signal. The mixed signal is then amplified by the LPA4722A chip in the earphone amplifier module, improving the signal-to-noise ratio before being output to the user's earphones. The microphone's built-in real-time voice monitoring can be easily enabled or disabled via the signal switching function of the mixing module, avoiding the need for complex monitoring switch operations on the XBOX console, which could lead to recording abnormalities.

Preferably, the microphone includes a built-in 2.4G wireless receiver module, using the JL7016M chip for protocol conversion and signal transmission. The receiver end also features the JL7016M chip, enabling wireless connection with the XBOX controller and compatibility with any host device that can be connected to the receiver.

During use, after connecting the devices according to the wiring method, the user speaks into the microphone's sound pickup hole. The microphone captures the voice and transmits the amplified audio signal through the amplification module to the signal processing module. The signal processing module acts as an intermediary control module, detecting control signals from the microcontroller, such as mute operations, volume adjustments, and monitoring switches. Based on the detected control signals, the microphone transmits the captured voice signal to the XBOX game controller via a four-pole 3.5 mm interface. The XBOX game controller uploads the voice signal to the game, enabling communication with teammates. Simultaneously, the XBOX game controller inputs game audio and teammate voices into the microphone through the same interface. The microphone's internal mixing module combines the game audio, teammate voices, and the user's speech, which is then amplified by the internal earphone amplifier module and output through the 3.5 mm earphone interface. This allows users to hear both the game and teammate voices while monitoring their own speech in real-time, ensuring they are aware of their speaking status.

The multi-function button is a rotary potentiometer with a switch function. Pressing and holding the button for 2 seconds turns the microphone's power on or off. A single click enables or disables the microphone's earphone monitoring function. Rotating the potentiometer adjusts the microphone's gain, with clockwise rotation increasing the gain and counterclockwise rotation decreasing it. The touch button is implemented using the AIP5901 touch chip. A single click toggles the microphone's mute function, while pressing and holding the button for 2 seconds cycles through the RGB ambient lighting modes, including turning the lighting effects off.

The above examples can bring the following beneficial effects:

The microphone allows for one-touch muting and enabling/disabling of the sound pickup function through its touch button, making it simple and convenient. Compared to traditional 3.5 mm earphones, the microphone in the above example adds a one-touch mute function, enabling users to quickly mute the microphone or enable/disable the sound pickup function in emergencies or when they do not wish to use the microphone. This provides a simple and convenient solution. Additionally, the microphone's rotary potentiometer allows users to adjust the gain and toggle the real-time monitoring function via the potentiometer's button, offering quick and easy operation. Traditional headsets lack volume adjustment and real-time monitoring of the user's voice, making it difficult for users to assess their speaking volume and audio quality. The microphone in the above example adds a knob to adjust the gain and enables real-time monitoring of the microphone's audio through the earphones. Users can adjust the gain by rotating the knob and toggle the real-time monitoring function using the knob's button, allowing them to monitor game audio, teammate voices, and their own speech simultaneously. This significantly improves the user experience. The microphone's earphone output port allows users to monitor game audio, teammate voices, and their own speech, providing microphone input functionality for the XBOX game controller without occupying its earphone audio output function. This perfectly replaces conventional four-pole earphones. Four-pole earphones typically use a 6 mm diameter omnidirectional microphone capsule, which has a small diaphragm, poor sound detail, and high environmental noise, resulting in subpar performance. The microphone in the above example uses a 14 mm diameter cardioid condenser microphone, effectively reducing environmental noise. Its larger diaphragm offers higher sensitivity, clearer sound, richer audio details, and better sound quality. The built-in rechargeable lithium battery eliminates the need for an external power supply, and the earphone audio output is directly powered by the microphone, avoiding draining the XBOX game controller's battery. This perfectly addresses the issue of the XBOX game controller's limited power output capability.

Unlike existing technologies, the above technical solution provides a multi-functional microphone 1. The microphone includes an earphone amplifier module 101, a mixing module 102, a signal processing module 103, an amplification module 104, a sound pickup module 105, a power module 107, and a control unit 108. The earphone amplifier module 101 is electrically connected to the mixing module 102, which is further electrically connected to the XBOX game controller 2. The earphone amplifier module 101 is electrically connected to the earphones 3 and is used to transmit audio signals from the XBOX game controller 2. This enables direct connection between the earphones 3 and the XBOX game controller 2 via the microphone, eliminating the need for a dedicated headset. The microphone serves as an intermediary interface, ensuring compatibility with multiple earphones 3 and expanding the range of earphone options for users. The sound pickup module 105 is electrically connected to the amplification module 104, which is further electrically connected to the signal processing module 103. The sound pickup module 105 captures the user's voice, and the amplification module 104 amplifies the voice while filtering out environmental noise, improving the signal-to-noise ratio. The control unit 108 is electrically connected to the amplification module 104 and the power module 107. By incorporating the control unit 108, users can perform more complex operations such as enabling/disabling microphone functions and adjustments. The power module 107 provides energy storage for the microphone, facilitating independent use by users.

The above description represents only some embodiments of the invention and does not limit its scope of protection. Any equivalent devices or process transformations based on the content of this specification and drawings, whether directly or indirectly applied to other related technical fields, are similarly included within the scope of patent protection of the invention.

The invention claimed is:

1. A multi-functional microphone, characterized by comprising:
   an earphone amplifier module,
   a mixing module,
   a signal processing module,
   an amplification module,
   a sound pickup module,
   a power module, and
   a control unit;
   wherein:
   the earphone amplifier module is electrically connected to the mixing module; the mixing module is further electrically connected to the signal processing module; the mixing module is electrically connected to an XBOX game controller; the earphone amplifier module is electrically connected to earphones and is configured to transmit audio signals from the XBOX game controller;
   the sound pickup module is electrically connected to the amplification module; the amplification module is electrically connected to the signal processing module; the sound pickup module is configured to capture a user's voice; the control unit is electrically connected to the signal processing module; and the control unit is further electrically connected to the power module.

2. The multi-functional microphone according to claim 1, further comprising:
- a first interface electrically connected to the earphone amplifier module, wherein the earphone amplifier module is configured to be detachably connected to the earphones via the first interface;
- a second interface electrically connected to the mixing module and the signal processing module, wherein the mixing module is configured to be detachably connected to the XBOX game controller via the second interface; and
- a third interface electrically connected to the power module, wherein the power module is configured to be detachably connected to an external power source via the third interface.

3. The multi-functional microphone according to claim 2, wherein:
- the first interface is a three-pole 3.5 mm earphone interface; and/or
- the second interface is a four-pole 3.5 mm game controller interface; and/or
- the third interface is a Type-C interface.

4. The multi-functional microphone according to claim 2, further comprising:
- a microphone gain adjustment module electrically connected to the control unit.

5. The multi-functional microphone according to claim 2, wherein the power module comprises:
- a battery electrically connected to the third interface; and
- a charging protection module positioned between the battery and the control unit.

6. The multi-functional microphone according to claim 2, further comprising:
- a mute control module electrically connected to the control unit.

7. The multi-functional microphone according to claim 6, further comprising:
- an RGB ambient light electrically connected to the control unit; and
- a light control module electrically connected to the control unit.

8. The multi-functional microphone according to claim 7, further comprising:
- a touch sensing module electrically connected to the mute control module and the light control module, wherein the touch sensing module is configured to enable/disable the mute control module and adjust the RGB ambient light.

9. The multi-functional microphone according to claim 1, further comprising:
- a rotary potentiometer electrically connected to the amplification module, wherein the rotary potentiometer is equipped with a tactile switch electrically connected to the control unit, and the tactile switch is configured to control the connection between the mixing module and the signal processing module.

10. The multi-functional microphone according to claim 1, wherein the electrical connection between the mixing module and the XBOX game controller is configured as one of the following: Bluetooth connection, Wi-Fi connection, NB-IoT connection, or wireless private protocol connection.

11. The multi-functional microphone according to claim 1, wherein the electrical connection between the mixing module and the XBOX game controller is configured as a wired connection and/or a wireless connection.

12. The multi-functional microphone according to claim 11, wherein, in the case of a wireless connection, the multi-functional microphone further comprises:
- a first antenna electrically connected to the mixing module; and
- a receiver component wirelessly connected to the mixing module.

13. A voice chat device, characterized by comprising:
- a microphone according to claim 1;
- earphones electrically connected to the microphone;
- an XBOX game controller electrically connected to the microphone; and/or
- a terminal device electrically connected to the microphone.

* * * * *